United States Patent [19]

Moorer et al.

[11] 3,720,731
[45] March 13, 1973

[54] ALKYLATION PROCESS EMPLOYING FLASH VAPORIZATION OF EXCESS OLEFIN FROM AN OLEFIN ABSORPTION STEP

[75] Inventors: Henry D. Moorer, Richmond, Va.; Richard W. Stokeld, Jr., Anacortes, Wash.

[73] Assignee: Texas Inc., New York, N.Y.

[22] Filed: Aug. 23, 1971

[21] Appl. No.: 173,893

[52] U.S. Cl. .......................... 260/683.62, 260/683.61
[51] Int. Cl. .................................................. C07c 3/54
[58] Field of Search ........ 260/683.61, 683.62, 683.59

[56] References Cited

UNITED STATES PATENTS

| | | | |
|---|---|---|---|
| 3,234,301 | 2/1966 | Goldsby | 260/683.61 |
| 3,422,164 | 1/1969 | Goldsby | 260/683.61 |
| 3,448,168 | 6/1969 | Goldsby | 260/683.61 |
| 3,462,512 | 8/1969 | Goldsby | 260/683.61 |

Primary Examiner—Curtis R. Davis
Assistant Examiner—G. J. Crasanakis
Attorney—Thomas H. Whaley et al.

[57] ABSTRACT

Method for providing refrigeration and increasing spent acid recovery in a sulfuric acid alkylation process comprising an alkylation reaction and an olefin absorption reaction involving reacting spent acid catalyst with a molar excess of olefin in an olefin absorber, separating the olefin absorber effluent into an acid phase and an olefin phase, extracting the resulting dialkyl sulfates from the acid phase and passing them to alkylation, passing the olefin phase into indirect heat exchange contact with the alkylation reaction and the olefin absorption reaction, flash vaporizing a portion of the olefin to provide necessary refrigeration, and recirculating at least a portion of the olefin recovered from the heat exchange to the olefin absorption reaction.

12 Claims, 3 Drawing Figures

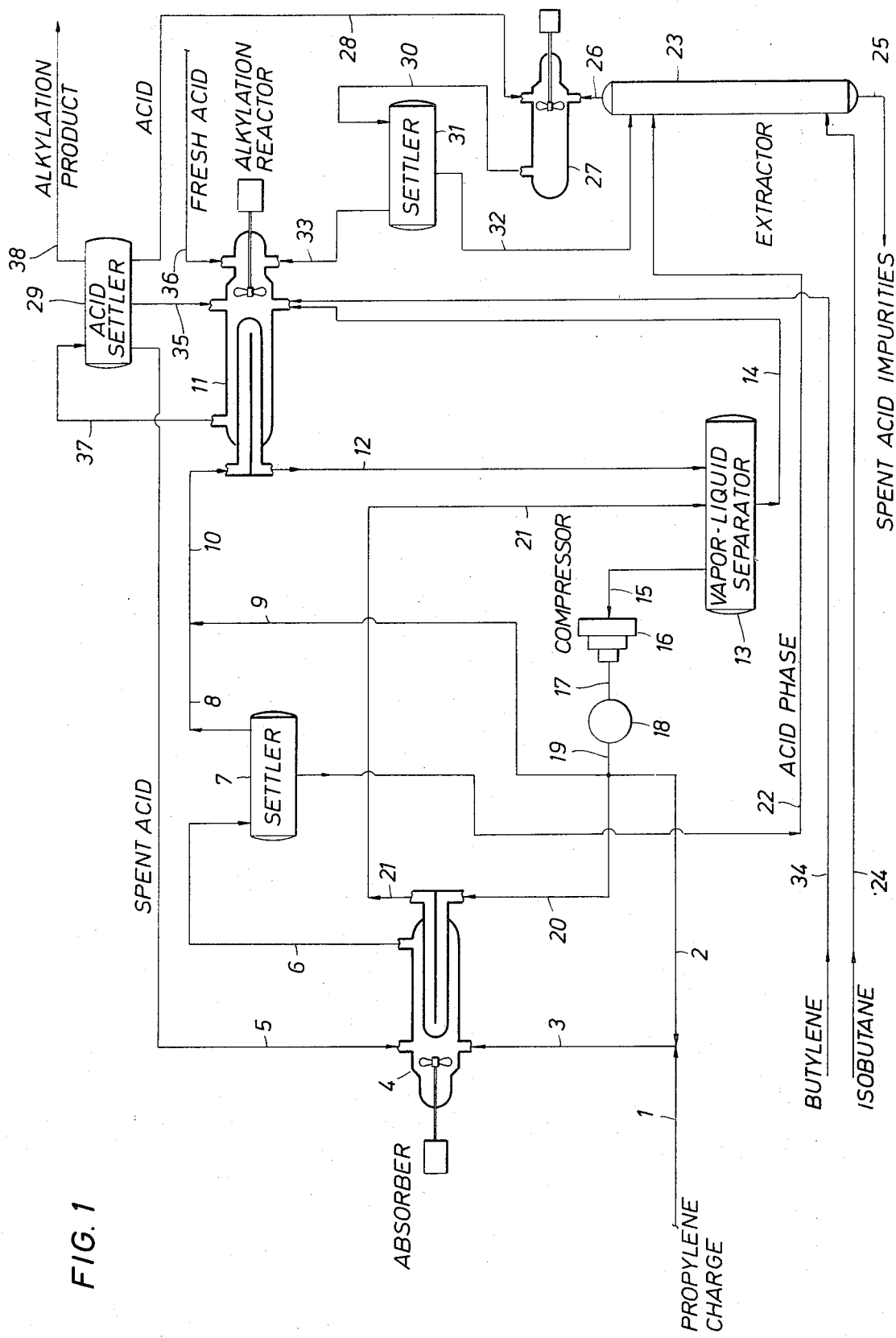

3,720,731

ALKYLATION PROCESS EMPLOYING FLASH VAPORIZATION OF EXCESS OLEFIN FROM AN OLEFIN ABSORPTION STEP

BACKGROUND OF THE INVENTION

It is known that spent sulfuric acid alkylation catalyst may be recovered from an alkylation reaction zone and regenerated by the reaction of an olefin with such spent sulfuric acid to form dialkyl sulfates. The dialkyl sulfates may be separated from unreacted sulfuric acid and acid contaminants, for example by extraction with isobutane. The isobutane extract solution of dialkyl sulfates may be acid washed for the removal of acid soluble contaminants. Such separated dialkyl sulfates may be employed to alkylate isobutane. In the alkylation reaction substantially pure sulfuric acid is regenerated upon alkylation of the dialkyl sulfates with the isobutane. By regenerating spent sulfuric acid alkylation catalyst, less fresh makeup acid needs to be added to the alkylation zone, and the net acid consumption and cost for the alkylation reaction are greatly reduced.

Both the alkylation reaction and the olefin absorption reaction are exothermic and refrigeration must be provided to remove these heats of reaction. Refrigeration from a source external to the process may be employed but internal refrigeration methods are simpler and more economical. Effluent refrigeration is an internal refrigeration method wherein the hydrocarbon effluent from the alkylation reaction which usually contains 50 percent or more isobutane is passed at a reduced pressure into a heat exchanger in contact with the alkylation reaction mixture. The alkylation heat of reaction causes vaporization of the isobutane under the reduced pressure and consequently results in cooling the alkylation reaction mixture. Emulsion flashing is another internal refrigeration method. In this refrigeration method the emulsion effluent from the alkylation reaction, comprising sulfuric acid dispersed in a hydrocarbon phase wherein the hydrocarbon phase comprises about 50 percent isobutane, is passed into a flash drum operated at a reduced pressure. In the flash drum the hydrocarbon phase separates from the acid phase and under the conditions of reduced pressure isobutane and other light hydrocarbons are vaporized thus resulting in cooling the liquid hydrocarbon phase and the acid phase. The cooled liquid hydrocarbon phase is passed into indirect heat exchange with the alkylation reaction mixture and at least a portion of the acid phase is returned to the alkylation reaction for direct heat exchange with the alkylation reaction mixture. A third internal method for cooling the alkylation reaction mixture involves maintaining the pressure of the alkylation reaction such that a portion of the isobutane content of the alkylation reaction mixture is vaporized within the alkylation reactor at such a rate that the heat of reaction is removed from the reactor. A fourth internal refrigeration method is disclosed in U.S. Pat. No. 3,580,962, wherein the heats of reaction for the alkylation reaction and the olefin absorption reaction are removed employing a common refrigerant stream. In this method the isobutane stream containing dialkyl sulfates extracted from the acid phase effluent of the olefin absorption reaction is flash vaporized as a source of cooling, and passed to the alkylation reactor and the olefin absorber in indirect heat exchange with the contents thereof to remove the heats of reaction generated in these reaction vessels.

In the first three internal refrigeration methods described above, the isobutane is admixed with heavier hydrocarbons with considerably higher boiling points than isobutane. These heavier hydrocarbons tend to reduce the partial pressure of the hydrocarbon mixture being vaporized, thereby increasing the pressure differential which must be maintained to vaporize sufficient isobutane and provide the necessary cooling. The fourth method discussed above requires that isobutane be vaporized at a pressure of about 18 psia in order that the temperature of the cooling medium entering the process heat exchangers may be maintained at about 20°F.

SUMMARY OF THE INVENTION

The present invention relates to a method for providing internal refrigeration to remove the exothermic heat of reaction and thereby control the reaction temperatures in a process wherein isoparaffins are alkylated with olefins in the presence of strong sulfuric acid catalyst and wherein spent sulfuric acid catalyst is converted to dialkyl sulfates by absorbing olefins into said sulfuric acid. Dialkyl sulfates from the olefin absorption reaction are recycled to the alkylation reaction for reaction with isobutane to form additional amounts of alkylated hydrocarbon. In accordance with the invention, spent sulfuric acid catalyst is contacted with a molar excess of olefin in an olefin absorption step at an olefin to acid mole ratio of from about 2.6:1 to about 20:1 to convert at least about 50 percent of the spent acid to dialkyl sulfates. Excess olefin is recovered from the olefin absorption reaction and subjected to a reduced pressure whereby a portion of the olefin is vaporized and the temperature of such recovered olefin is reduced. Such cooled olefin is circulated in indirect heat exchange with the reaction mixtures of the olefin absorption reaction and the alkylation reaction to remove the heats of reaction therefrom.

By following the method of the present invention, an internal refrigeration method is provided by vaporizing and circulating excess olefin. Additionally, a substantially greater portion of the spent alkylation catalyst is recovered as dialkyl sulfate by maintaining the olefin in a substantial molar excess to the unreacted spent acid in the olefin adsorption step.

BRIEF DESCRIPTION OF THE DRAWINGS

FIG. 1 of the drawing is a schematic representation of one embodiment of the present invention wherein an alkylation reaction and an olefin absorption reaction are carried out and a circulating olefin stream is employed to provide internal refrigeration for the process and to provide a molar excess of olefin for reaction with spent sulfuric acid in the olefin absorption step.

DETAILED DESCRIPTION OF THE DRAWING

Figure 3:
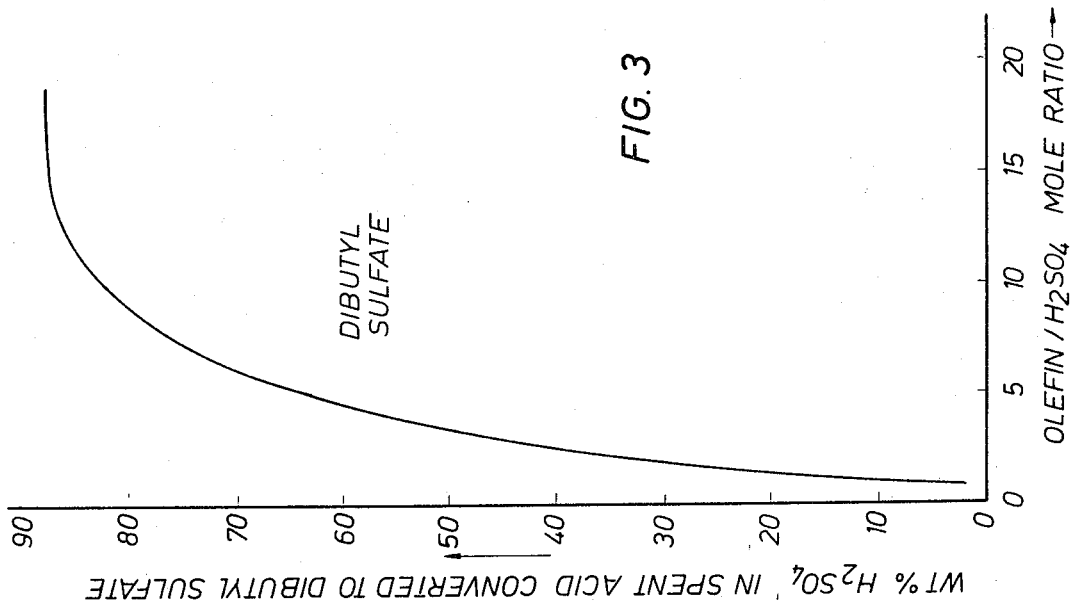
FIG. 3 of the drawing shows the increasing conversion of sulfuric acid to di-butyl sulfate with increasing butylene to sulfuric acid molar ratio in the olefin absorber.

In an alkylation reaction within the contemplation of the present invention, an isoparaffin hydrocarbon is alkylated with an olefin hydrocarbon in the presence of a concentrated sulfuric acid catalyst. Such an alkylation reaction is carried out in the liquid phase at a temperature of from about 0°F. to about 150°F. Preferably the temperature of the alkylation reaction is maintained between about 30°F. and 50°F. Isoparaffins useful in such an alkylation reaction include isobutane, isopentanes, etc., and mixtures thereof. Olefin hydrocarbon useful as reactants in such an alkylation reaction include propylene, butylene, pentylene, their isomers, and mixtures thereof.

The sulfuric acid employed as a catalyst in an alkylation reaction must be of a relatively high degree of purity. That is, preferably the sulfuric acid employed in the alkylation reaction comprises from about 85 percent to about 98 percent or higher by weight sulfuric acid. At acid concentrations below about 85 percent, side reactions yielding undesirable products increase to the point where they substantially interfere with the yield of the desirable alkylated hydrocarbons. The concentration of the sulfuric acid catalyst employed in the alkylation reaction is maintained at a desirably high level by adding fresh concentrated sulfuric acid to the alkylation reaction and by continually withdrawing a portion of the sulfuric acid which has been used in the alkylation reaction. By this means acid contaminants such as water and polymerized hydrocarbons which decrease the sulfuric acid catalyst concentration are removed from the process and are replaced by fresh uncontaminated sulfuric acid.

In such an alkylation reaction where an isoparaffin is reacted with an olefin hydrocarbon to yield alkylated hydrocarbons, a substantial heat of reaction is released. Since, as mentioned above, it is desirable to maintain the alkylation reaction at a relatively low temperature and preferably in the temperature range of from about 30°F. to about 50°F. it is necessary that some means of refrigeration be supplied to remove the heat of reaction and thereby maintain the alkylation reaction within the desired temperature range.

Sulfuric acid removed from the alkylation process, hereinafter referred to as spent acid, may be treated in an olefin absorption reaction to convert a substantial portion of the spent acid into dialkyl sulfate compounds. These dialkyl sulfate compounds may then be recovered and returned to the alkylation reaction wherein they undergo a chemical reaction with isoparaffin hydrocarbons to yield alkylated hydrocarbons and sulfuric acid. By means of combining an alkylation reaction with an olefin absorption reaction, the net consumption of sulfuric acid required to produce alkylated hydrocarbons may be substantially reduced. For example, in an alkylation reaction wherein isobutane is alkylated with an olefin mixture comprising about 35 percent propylene and about 65 percent butylene in the presence of an acid catalyst comprising about 90 percent sulfuric acid, the acid consumption is typically about 0.5 lbs. per gallon of alkylated hydrocarbon produced. By employing an olefin absorption reaction, wherein a portion of the olefin hydrocarbon charged to the alkylation reaction is contacted with the spent acid stream to form dialkyl sulfates and these dialkyl sulfates are subsequently returned to the alkylation reaction for conversion into further amounts of alkylated hydrocarbon and sulfuric acid, the net acid consumption for such a combined process may be reduced to about 0.25 lbs. or less per gallon of alkylated hydrocarbon formed.

It has been noted that when propylene is employed in the olefin absorption reaction to react with the spent acid to form di-isopropyl sulfates that the only substantial side reaction product which is formed is mono-isopropyl sulfate. Such di-isopropyl sulfates in solution with unreacted sulfuric acid, mono-isopropyl sulfate, and acid contaminants may be conveniently separated from excess propylene by subjecting the effluent from the olefin absorption reaction to a settling step wherein a propylene phase is separated from an acid phase. The acid phase, containing di-isopropyl sulfates is then treated with the isoparaffin hydrocarbon in an extraction step wherein the di-isopropyl sulfates are dissolved into the isoparaffin hydrocarbon. In the extraction step, unreacted sulfuric acid and acid contaminants are removed from the process and an isoparaffin hydrocarbon stream containing di-isopropyl sulfate is recovered for charge to the alkylation reaction.

It is also known that a mixture of propylene and butylene, or butylene alone may be employed in a like manner in the olefin absorption reaction and dialkyl sulfates may be similarly recovered for charge to the alkylation reaction. However, it has been noted that when the butylene hydrocarbon component contains a substantial amount of isobutylene hydrocarbons, a butylene polymerization side reaction occurs in the olefin absorption reaction. It has also been noted that the dialkyl sulfates formed and the butylene polymers both dissolve into the isoparaffin stream in the extraction step and are returned together to the alkylation reaction. The butylene polymers will react in the alkylation reaction to form alkylated hydrocarbons. However, the butylene polymers increase acid consumption in the alkylation reaction and tend to produce alkylated hydrocarbons of a higher molecular weight then are generally found to be useful. Although it is known that the butylene polymers have such deleterious effects upon the alkylation reaction, it has been found that such deleterious effects are primarily caused by the high polymers of butylene such as trimers, tetramers and higher. Dimers of butylene do not seriously contribute to increased acid consumption. The alkylated products of butylene dimers are acceptable for such uses as components of high octane gasoline. The formation of butylene polymers in the olefin absorption reaction may be substantially eliminated by removing isobutylene from the butylene stream prior to contact with spent acid. The formation of butylene polymers may be depressed and the relative proportion of butylene dimers to heavier polymers may be increased in an olefin absorption reaction employing an isobutylene contaminated butylene stream by increasing the olefin to acid ratio. Preferably, the olefin to acid ratio in an olefin absorption reaction is about 11:1 or higher when an isobutylene contaminated butylene stream is employed therein.

Preferably, when an alkylation reaction is combined with an olefin absorption reaction, the propylene component of the alkylation reaction charge is supplied to the olefin absorption reaction for the purpose of insuring that primarily only di-isopropyl sulfates will be recovered for charge to the alkylation reaction. This results in minimizing the acid consumption and insuring the production of an acceptable alkylated hydrocarbon product. By employing only the propylene charge on a once through basis in the olefin absorption reaction in such cases where a mixed propylene-butylene olefin charge is provided to the alkylation reaction, it has been found that substantial amounts of the spent acid are not reacted and that substantial amounts of the spent acid react only to form the mono-isopropyl sulfate. Therefore, in a case such as where the olefin charge to the alkylation reaction comprises about 35 percent propylene and about 65 percent butylene, and wherein only the propylene is charged to a single stage olefin absorption reaction, it has been found that only about 58.5 percent of the spent acid may be recovered as di-isopropyl sulfate for return to the alkylation reaction. It has been further found that there is a substantial loss of propylene in the form of mono-isopropyl sulfate which is removed from the process along with the unreacted acid from the isobutane extraction step.

Figure 2:
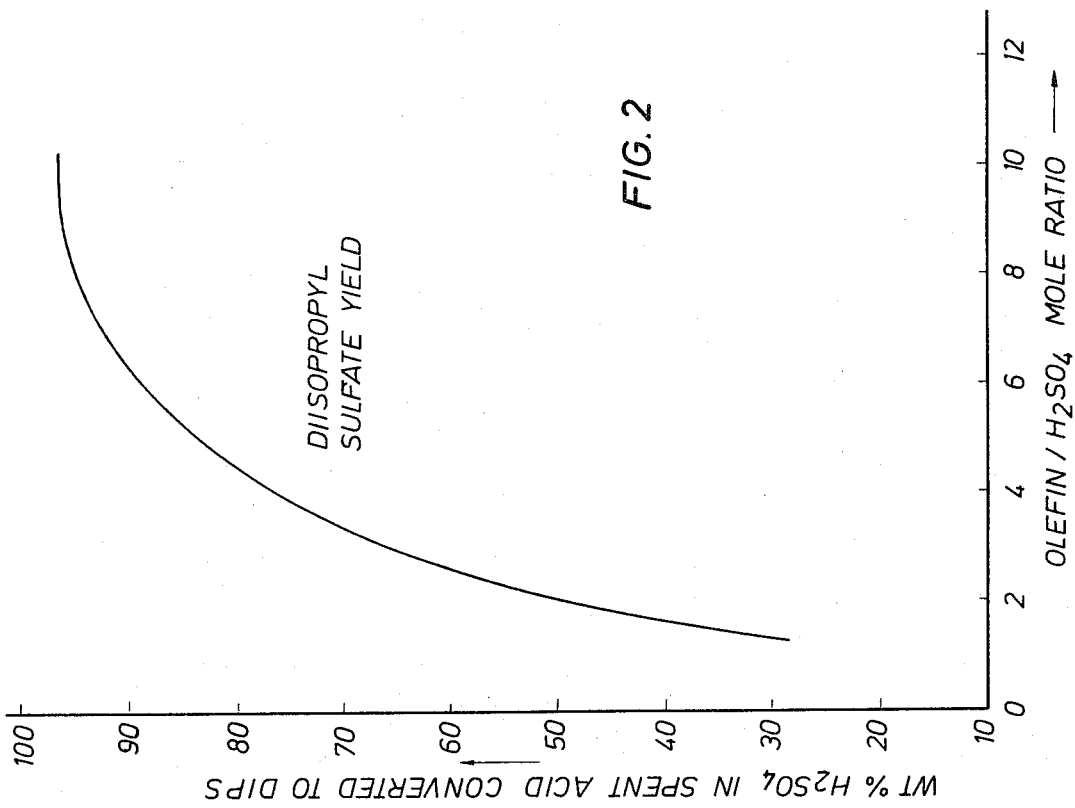
FIG. 2 of the drawings is a graph showing the increasing conversion of sulfuric acid to di-isopropyl sulfate in the olefin absorber which results from increasing the propylene to sulfuric acid molar ratio.

It has been found that the proportion of spent acid which may be recovered as dialkyl sulfates may be substantially increased by increasing the molar ratio of olefin to sulfuric acid in the olefin absorption reaction. Thus by increasing the ratio of olefin to sulfuric acid in the absorption reaction, not only is the amount of sulfuric acid recovered increased, but the amount of olefin loss to the process as mono-alkyl sulfate is decreased by a proportional amount. To demonstrate this reference is now made to FIGS. 2 and 3 of the drawings. FIG. 2 of the drawings is a graphical representation demonstrating the increasing conversion of sulfuric acid to diisopropyl sulfate as the molar ratio of propylene to sulfuric acid in increased. FIG. 3 of the drawings is a graphical representation demonstrating the increasing conversion of sulfuric acid to dibutyl sulfate as the ratio of butylene to sulfuric acid is increased.

As an example demonstrating the advantage of increasing the molar ratio of olefin to acid consideration may be given to an alkylation process wherein about 5,000 barrels per day of alkylated hydrocarbon is produced by reacting a stream of 23,209 barrels per day comprising isobutane with a stream of 5,221 barrels per day comprising butylenes and a stream of 1,302 barrels per day comprising propylene in the presence of sulfuric acid catalyst at a temperature of about 45°F. under conditions of vigorous mixing. To maintain a desired catalyst strength of about 90 percent sulfuric acid, about 2,500 lbs. per hour of spent acid catalyst is removed from the alkylation reaction and fresh 98 percent sulfuric acid is added as makeup.

According to one method of the prior art, the propylene stream entering the process is contacted with the spent acid in an olefin absorber wherein propylene reacts with sulfuric acid to form di-isopropyl sulfate. This diisopropyl sulfate is subsequently recovered by extraction into the isobutane stream and is returned to the alkylation reaction wherein it is converted into alkylated hydrocarbons and pure sulfuric acid. In following this prior art method, the molar ratio of propylene to sulfuric acid in the olefin absorber is about 2.6/1. By referring to FIG. 2 of the drawings it can be seen that only about 58.5 percent of the sulfuric acid is recovered as di-isopropyl sulfate. A known improvement to this method of recovering sulfuric acid comprises employing two olefin absorbers in series wherein spent sulfuric acid enters the first absorber and propylene enters the second absorber and the propylene and acid are contacted in counter current flow. By employing this improvement requiring two olefin absorbers the recovery of sulfuric acid may be increased to about 81 percent.

Now consider the method of the present invention wherein spent acid and propylene are contacted in only one absorber. The propylene stream to the absorber comprises propylene charge to the alkylation process and a recirculating propylene stream. Effluent from the absorber is separated into an acid phase containing di-isopropyl sulfate and a propylene phase. The acid phase is treated with isobutane as described above for recovery of di-isopropyl sulfate. The propylene phase is separated into two portions, one portion supplied as olefin reactant to the alkylation reaction and the second portion recirculated to the olefin absorber to increase the olefin to hydrocarbon ratio. By examining FIG. 2 of the drawings it can be seen that by recirculating sufficient propylene to increase the olefin to acid molar ratio to 4.6/1 that 81 percent of the sulfuric acid can be recovered in one olefin absorption step. This acid recovery is equivalent to the recovery obtained in the prior art methods wherein two olefin absorbers are employed. Also from FIG. 2 of the drawing it can be seen that by increasing the propylene to acid molar ratio to about 6.2/1 that 90 percent of the sulfuric acid may be recovered in one olefin absorption step. The sulfuric acid recovery obtained by following this improvement of the present invention are thus seen to be higher than sulfuric acid recoveries obtainable by following the methods of the prior art.

It has also been found that where butylene containing isobutylene is employed as a component of the olefin charged to the olefin absorption reaction, that increasing the olefin to sulfuric acid molar ratio not only increases the conversion of sulfuric acid to dialkyl sulfates, but shifts the butylene polymerization reaction to favor the formation of dimers rather than heavier polymers. Thus, since it is known that butylene dimers are an acceptable charge to an alkylation reaction, it is possible by increasing the butylene to sulfuric acid ratio in the olefin absorber to recover an increased amount of the spent acid without admitting an excessive amount of undesirable butylene polymers, such as trimers and heavier, into the alkylation process.

Both the alkylation reaction and olefin adsorption reaction liberate substantial amounts of heat which arise from the heats of reaction, mixing power input, and sensible heat added with the reactants. As discussed above, the preferred operating range for the alkylation reaction is from about 30°F. to about 50°F. It has been found that a preferred temperature operating range for the olefin absorption reaction is from about 30°F. to about 60°F. Therefore, to maintain these desired operating temperatures, it is necessary to provide refrigeration for both the alkylation reaction and the olefin absorption reaction.

An example of the heat which must be removed by a refrigeration system may be obtained by considering an alkylation process for the production of 5,000 barrels per day of alkylate by alkylating isobutane with an olefin mixture comprising about 35 percent propylene and about 65 percent butylene, which process incorporates an olefin absorption reaction for the recovery of sulfuric acid from the spent acid stream. In such a process the heat load on the refrigeration system for the alkylation reaction is about 9 million BTU's per hour and the heat load for the olefin absorption reaction is about 993,000 BTU's per hour.

Now according to the present invention, a method has been discovered for increasing the ratio of olefin to sulfuric acid in the olefin absorption reaction and simultaneously providing the necessary refrigeration for maintaining the desired operating temperature of the alkylation reaction and the olefin absorption reaction. In the method of the present invention liquid olefin hydrocarbon is employed as the refrigerating fluid for indirect heat exchange with the reaction mixture of the olefin absorption reaction and with the reaction mixture of the alkylation reaction. Cooling is provided by maintaining the olefin liquid under a reduced pressure such that as heat is absorbed from the reaction mixtures by indirect heat exchange means, a portion of the olefin liquid will vaporize. The vaporized olefin is subsequently compressed and condensed into the liquid phase for recirculation through the refrigeration system. A portion of the condensed olefin, rather than being recirculated directly to the indirect heat exchange means, is admitted into an olefin absorber in order to increase the olefin to acid molar ratio of the olefin absorption reaction mixture. At the same time, at least a portion of the olefin charge to the alkylation reaction is also admitted into the olefin absorber as makeup for the olefin which reacts with sulfuric acid to form dialkyl sulfates. From the olefin absorber the reaction mixture is transferred into a settler wherein an olefin hydrocarbon phase is separated from an acid phase containing the dialkyl sulfates. The acid phase is removed from the settler and the dialkyl sulfates are recovered by extracting into an isoparaffin stream. This isoparaffin stream containing dialkyl sulfates is then charged to the alkylation reaction. Preferably, the dialkyl sulfate containing isoparaffin stream is treated with sulfuric acid to remove any contaminants which may be present therein prior to charging such an isoparaffin stream to the alkylation reaction.

The olefin hydrocarbon phase from the settler is recombined with the circulating olefin refrigerant liquid stream. This mixture is employed to provide the necessary refrigeration for the alkylation reaction and the olefin absorption reaction. By following the method of the present invention, the necessary refrigeration may be provided and at the same time an increased proportion of the sulfuric acid may be recovered from the spent acid stream.

The recirculating olefin employed in the refrigeration system in the practice of the method of the present invention is selected from the olefins charged to the alkylation reaction. Where propylene comprises at least a portion of the olefin charge to the alkylation reaction, preferably propylene is employed for contact with the spent acid in the olefin absorber. By employing propylene in the olefin absorber, substantially no polymerization of the olefin occurs. Additionally, by employing propylene as a refrigerant liquid, substantial savings in the power requirement for compressing the vaporized olefins may be obtained when compared to refrigeration systems employing heavier hydrocarbons such as isobutane. For example, in the method of the present invention, wherein propylene is employed as a refrigerant liquid and is vaporized at a temperature of 20°F. to provide cooling to the process, 1.75 lbs. per minute of propylene vapor must be compressed at a compression ratio of 3.4:1 and condensed at 105°F. to provide one ton of refrigeration. In a process of the prior art wherein isobutane is vaporized from the alkylation reaction effluent at a temperature of 20°F. to provide the necessary cooling for the process, 1.98 lbs. per minute of isobutane must be compressed at a compression ratio of 3.8:1 and condensed at 105°F. to provide one ton of refrigeration. Thus by comparing the method of the present invention with the internal refrigeration methods of the prior art it can be seen that a compressor with less capacity and a lower compression ratio may be employed in the present invention. Consequently, the power to operate the compressor in the present invention is substantially lower than the power required to operate a compressor in an internal refrigeration method of the prior art.

The method of the present invention may be better understood by reference to FIG. 1 of the drawings which shows in schematic form an alkylation process comprising an alkylation reaction and an olefin absorption reaction wherein an olefin stream is circulated to provide the necessary refrigeration and to provide the desired olefin to acid ratio in the olefin absorption reaction. In this embodiment, isobutane is alkylated with an olefin mixture comprising about 35 percent and about 65 percent butylene to produce a high octane gasoline alkylate. Only propylene is charged to the olefin absorption reaction.

A propylene charge stream at a rate of 1,302 barrels per day is charged to the alkylation process via line 1 and is combined with 2,232 barrels per day of recirculating propylene via line 2. This propylene mixture passes via line 3 into the olefin absorber 4 wherein it is contacted under conditions of vigorous mixing with about 2,500 lbs. per hour of spent acid which enters the olefin absorber 4 via line 5. From the olefin absorber 4, the reaction mixture is transferred via line 6 to a first settler 7 wherein a hydrocarbon phase is separated from an acid phase by gravity separation. The hydrocarbon phase from the first settler 7 is removed via line 8 and mixed with a second circulating propylene stream from line 9. This propylene mixture is transferred via line 10 to the alkylation reactor 11 wherein it is partially vaporized at a temperature of about 20°F. thereby providing the necessary cooling by indirect heat exchange means to maintain the alkylation reaction mixture temperature at about 45°F. From the alkylation reactor 11 a mixed stream of propylene vapor and liquid is transferred via line 12 to a vapor liquid separator 13. A portion of the liquid from the separator 13 is transferred via line 14 as a reactant olefin to the alkylation reactor 11. Vapor from the vapor liquid separator 13 is transferred via line 15 to the compressor 16. From the compressor 16 the compressed olefin vapor is transferred via line 17 to a condenser 18 wherein the compressed vapor is condensed at a temperature of about 105°F. The condensed olefin leaving the condenser 18 via line 19 is divided into three streams. One stream is circulated via line 2 to the olefin absorption reaction as hereinabove described. A second stream via line 9 is circulated to provide refrigeration for the alkylation reaction as hereinabove described. A third stream of about 792 barrels per day is transferred via line 20 to the olefin absorber 4 wherein it is employed as refrigerant liquid in an indirect heat exchange means to maintain the temperature of the olefin absorption reaction at about 40°F. From the olefin absorption reactor 4 a mixed phase stream of propylene is transferred via line 21 to the vapor-liquid separator 13.

From the first settler 7 the acid phase comprising unreacted sulfuric acid, dialkyl sulfates, and acid contaminants is transferred via line 22 to an extractor 23 wherein the dialkyl sulfate content of the acid phase is extracted into an isobutane phase. Isobutane at a rate of about 23,209 barrels per day enters the extractor 23 via line 24 wherein the isobutane is contacted with the acid phase. From the bottom of the extractor 23 about 68 barrels per day of a stream comprising unreacted spent sulfuric acid and acid contaminants is removed from the alkylation process via line 25. Overhead from the extractor 23 an isobutane stream containing substantially all the dialkyl sulfates extracted from the acid phase is removed via line 26 to an acid treater 27. A small stream of sulfuric acid enters the acid treater 27 via line 28 from an alkylation reactor acid settler 29. In the acid treater 27 the isobutane-dialkyl sulfate mixture is treated with sulfuric acid to remove any contaminants picked up by the isobutane stream from the acid phase in the extractor 23. From the acid treater 27 the effluent passes via line 30 to a second settler 31 wherein the acid phase is separated from the hydrocarbon phase by gravity settling. From the second settler 31 the acid phase is transferred via line 32 to the extractor 23. The hydrocarbon phase containing isobutane and dialkyl sulfates is transferred from the second settler 31 via line 33 to the alkylation reactor 11. A butylene stream at a rate of about 5,221 barrels per day is charged to the alkylation reactor 11 via line 34. Recycle sulfuric acid is charged from the acid settler 29 to the alkylation reactor 11 via line 35 and fresh sulfuric acid at a rate of about 33 barrels per day is charged to the alkylation reactor 11 via line 36. In the alkylation reactor 11 the reactants comprising propylene, butylene, isobutane, and dialkyl sulfates are vigorously mixed with the sulfuric acid catalyst to form an emulsion. Under the operating conditions of the alkylation reactor 11 isobutane is alkylated with propylene and butylene. Also isobutane is alkylated with the dialkyl sulfate to yield an alkylated hydrocarbon and sulfuric acid.

From the alkylation reactor 11 the reaction mixture is transferred via line 37 to the acid settler 29 wherein a hydrocarbon phase is separated from an acid phase by gravity settling. From the acid settler 29 the hydrocarbon phase, containing about 5,000 barrels per day of alkylated hydrocarbon is removed as a product stream from the alkylation process via line 38. As hereinbefore described, spent acid is withdrawn from the acid settler 29 via line 5 and acid is recirculated to the alkylation reactor 11 via line 35.

In this example a circulating olefin stream is employed to provide a high (about 4.6:1) molar ratio of olefin to acid in the olefin absorber 4 and is simultaneously employed to provide the necessary refrigeration required to maintain the desired operating temperatures in the alkylation reaction and in the olefin absorption reaction. By following the method of this example, about 81 wt. percent of the spent sulfuric acid is recovered and the acid consumption in the alkylation process is only about 0.1 lbs. per barrel of alkylated hydrocarbon. The refrigeration required for operation of the alkylation reaction and the olefin absorption reaction is provided with a savings and power consumption of about 13 percent compared to internal refrigeration means employing isobutane as refrigerant.

FIG. 1 of the drawings is a schematic representation of an alkylation process embodying the method of the present invention and many conventional items normally employed but which are unnecessary to describe the present invention have been omitted. Such items as pumps, valves and instrumentation which are normally employed in commercial processes may readily be supplied by those skilled in the art.

It will be obvious to one skilled in the art that many modifications and variations of the present invention may be made without departing from the spirit and scope thereof. Therefore only such limitations should be imposed as are included in the following claims.

We claim:

1. In an alkylation process wherein isoparaffin is reacted with olefin in the presence of concentrated sulfuric acid catalyst in an alkylation reaction zone, wherein an emulsion effluent recovered from the alkylation reaction zone is separated into a hydrocarbon product phase and a first acid phase, wherein a portion of the acid from the first acid phase is recirculated to the alkylation reaction zone, wherein the concentration of the sulfuric acid catalyst is maintained by reacting another portion of the acid from the first acid phase with at least a portion of the olefin charge to the process in an olefin absorption zone to form dialkyl sulfates, wherein the effluent from said olefin absorption zone is separated into a hydrocarbon phase and a second acid phase comprising dialkyl sulfates, unreacted sulfuric acid and contaminants, wherein dialkyl sulfates are recovered from the second acid phase by extraction with the isoparaffin charge to the alkylation process, wherein the dialkyl sulfates in admixture with said isoparaffin are charged to the alkylation reaction zone for conversion into alkylated hydrocarbons and sulfuric acid; the improvement which comprises:

contacting in said olefin absorption zone said acid from said first acid phase with olefin in an olefin to acid molar ratio of from about 3/1 to about 20/1.

2. The improvement of claim 1 wherein the olefin to acid molar ratio is from about 4.6/1 to about 8/1.

3. The method of claim 1 wherein the olefin charge to the alkylation process is selected from the group consisting of propylene, butylene, and mixtures thereof and wherein the isoparaffin is isobutane.

4. The method of claim 1 wherein propylene is contacted with said acid in the olefin absorption zone.

5. The method of claim 1 which includes
   a. separating the olefin absorption zone effluent into a hydrocarbon phase and an acid phase comprising dialkyl sulfate, unreacted sulfuric acid and contaminants and b. recirculating a portion of said hydrocarbon phase from the separation step (a) to the olefin absorption zone sufficient to maintain the olefin to acid mole ratio from about 3/1 to about 20/1.

6. In an alkylation process which comprises charging isoparaffin, olefin, and dialkyl sulfate reactants and sulfuric acid catalysts to an alkylation reaction zone, withdrawing an alkylation emulsion effluent comprising hydrocarbon and sulfuric acid catalyst from said alkylation reaction zone, separating said emulsion effluent into a hydrocarbon phase and an acid phase, passing a portion of said acid phase into an olefin absorption zone as a first reactant, passing olefin as a second reactant into said olefin absorption zone to form an olefin absorption reaction mixture containing dialkyl sulfate, separating said reaction mixture into an absorption hydrocarbon phase and an absorption acid phase containing dialkyl sulfate, extracting dialkyl sulfate from said acid absorption phase in an extraction zone with said isoparaffin, contacting the dialkyl sulfate-isoparaffin solution in an acid treater with sulfuric acid, separating said acid-contacted solution from said acid, and passing said separated solution as a reactant into the alkylation reaction zone; the improvement which comprises:
   a. circulating a hydrocarbon stream comprising olefin in indirect heat exchange relationship with the alkylation reaction and the olefin absorption reaction to remove the heats of reaction by partially vaporizing said circulating hydrocarbon stream;
   b. condensing said hydrocarbon vapor under conditions of increased pressure;
   c. recirculating said condensed hydrocarbon for heat exchange with said reactions; and
   d. passing a portion of said condensed hydrocarbon into the olefin absorber to maintain the olefin to acid molar ratio from about 3/1 to about 20/1.

7. The method of claim 6 wherein separated absorber hydrocarbon is added to said circulating hydrocarbon stream.

8. The method of claim 7 wherein a portion of the circulating hydrocarbon stream is passed to the alkylation reaction zone as olefin reactant.

9. The method of claim 6 wherein a portion of said condensed hydrocarbon is passed into the olefin absorption zone to maintain the olefin to acid molar ratio from about 3/1 to about 20/1.

10. The method of claim 9 wherein separated absorber hydrocarbon is added to said circulating hydrocarbon stream and wherein a portion of the circulating hydrocarbon stream is passed to the alkylation reaction zone as olefin reactant.

11. The method of claim 10 wherein the olefin stream comprises propylene.

12. The method of claim 10 wherein the olefin stream comprises butylene; and wherein the olefin to acid molar ratio in the olefin absorption zone is from about 10/1 to about 20/1.

* * * * *